United States Patent
Vega Perez et al.

(10) Patent No.: US 10,919,756 B2
(45) Date of Patent: Feb. 16, 2021

(54) LOADING ASSEMBLY FOR CONVEYING A PRESSURIZED GAS STREAM AND A SWITCHING SYSTEM FOR USE IN A LOADING ASSEMBLY

(71) Applicant: SHELL OIL COMPANY, Houston, TX (US)

(72) Inventors: Pablo Antonio Vega Perez, Rijswijk (NL); Serge Latil, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 23 days.

(21) Appl. No.: 15/029,207

(22) PCT Filed: Oct. 17, 2014

(86) PCT No.: PCT/EP2014/072357
§ 371 (c)(1),
(2) Date: Apr. 13, 2016

(87) PCT Pub. No.: WO2015/055835
PCT Pub. Date: Apr. 23, 2015

(65) Prior Publication Data
US 2016/0258578 A1 Sep. 8, 2016

(30) Foreign Application Priority Data

Oct. 18, 2013 (EP) .................................. 13189337

(51) Int. Cl.
*B67D 9/00* (2010.01)
*F16L 25/00* (2006.01)
(Continued)

(52) U.S. Cl.
CPC ................ *B67D 9/00* (2013.01); *F16L 25/00* (2013.01); *F17C 5/06* (2013.01); *F17C 13/082* (2013.01);
(Continued)

(58) Field of Classification Search
CPC ..... B67D 9/00; B67D 9/02; F17C 5/06; F17C 13/082; F17C 2250/07; F17C 2227/0157
See application file for complete search history.

(56) References Cited

U.S. PATENT DOCUMENTS 3,455,333 A * 7/1969 Bily .................... B67D 9/02
137/615
3,586,350 A * 6/1971 Ashton ............... F16L 37/1205
285/24
(Continued)

FOREIGN PATENT DOCUMENTS

CN 2515185 Y 10/2002
CN 102264596 A 11/2011
(Continued)

OTHER PUBLICATIONS

Emco Wheaton, A Gardner Denver Product, B0300 LNG/CNG, Marine Loading Arm, Product Data Sheet, 2 pages.
(Continued)

*Primary Examiner* — Andrew D Stclair

(57) ABSTRACT

A loading assembly has a gas conduit that extends between a floating structure and another structure, to convey a pressurized gas stream between the two structures. An emergency disconnection coupler is configured in the gas conduit. A switching system is provided for controlling switching of an engagement mechanism in the emergency disconnection coupler between a locked position and an unlocked position (in either direction). The switching system is subject to two distinct fail-safe regimes: a fail-unlocked regime which inherently instructs for release of the emergency disconnection coupler, and a fail-closed regime which inherently precludes release of the emergency disconnection coupler when there is pressurized gas in the gas connection. The fail-unlocked regime is active when the gas pressure in the gas connection is below a predetermined
(Continued)

Figure 1:
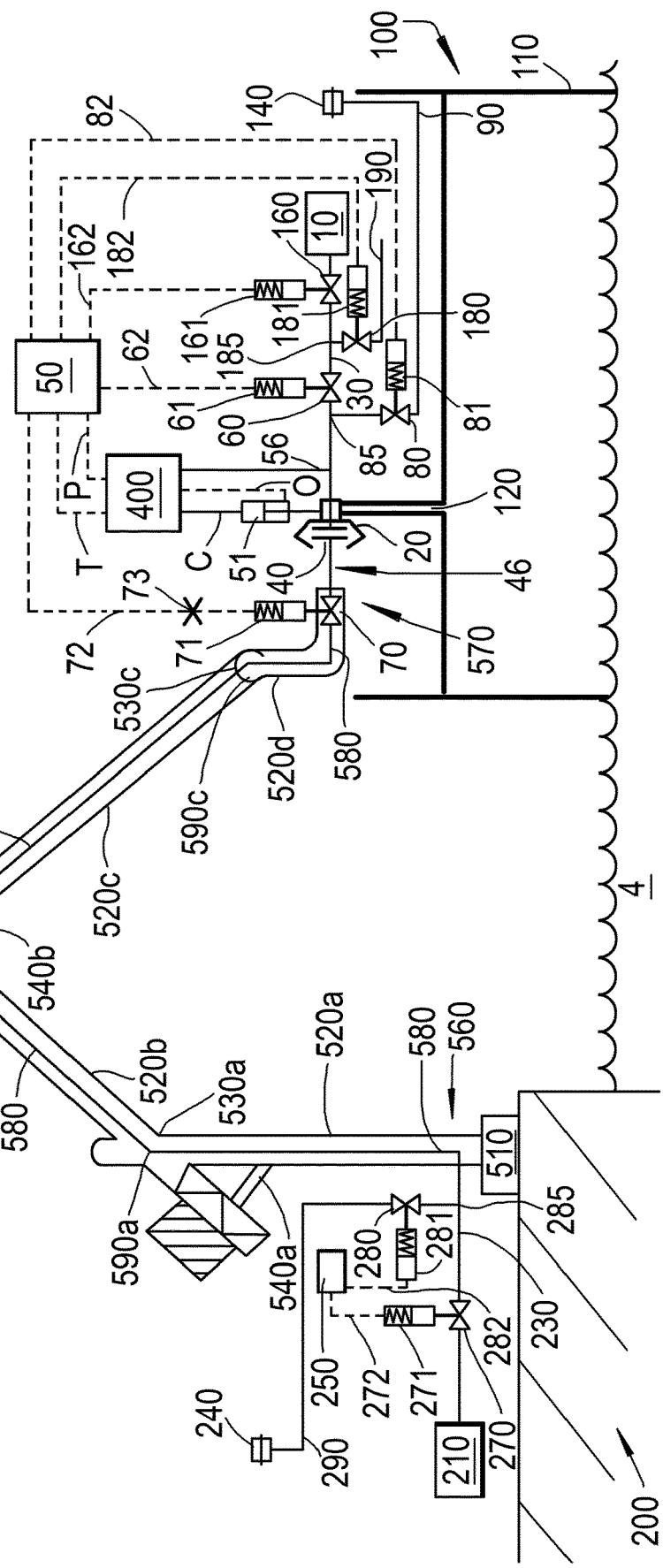

override threshold value. The fail-locked regime overrides the fail-unlocked regime.

13 Claims, 6 Drawing Sheets

(51) Int. Cl.
 *F17C 5/06* (2006.01)
 *F17C 13/08* (2006.01)
(52) U.S. Cl.
 CPC .. *F17C 2227/0157* (2013.01); *F17C 2250/07* (2013.01)

(56) References Cited

U.S. PATENT DOCUMENTS

| | | | | |
|---|---|---|---|---|
| 4,090,538 | A | * | 5/1978 | Kotcharian ............ B63B 21/50 137/236.1 |
| 4,222,591 | A | * | 9/1980 | Haley ................ F16L 37/1205 285/18 |
| 4,408,943 | A | * | 10/1983 | McTamaney ........... B63B 27/24 114/74 R |
| 5,259,700 | A | | 11/1993 | Langner |
| 6,843,511 | B2 | | 1/2005 | Barry |
| 2006/0156744 | A1 | | 7/2006 | Cusiter et al. |
| 2010/0263389 | A1 | | 10/2010 | Bryngelson et al. |

FOREIGN PATENT DOCUMENTS

| | | | |
|---|---|---|---|
| CN | 102781772 A | 11/2012 | |
| DE | 8809509 | 12/1988 | |
| FR | 2572786 | 5/1986 | |
| FR | 2638731 | 5/1990 | |
| FR | 2966553 | 4/2012 | |
| FR | 2967990 | 6/2012 | |
| GB | 572936 A * | 10/1945 | ............... F02D 9/00 |
| WO | 8402171 | 6/1984 | |
| WO | 200222491 | 3/2002 | |
| WO | 200228765 | 4/2002 | |
| WO | 200304925 | 1/2003 | |
| WO | 200354435 | 7/2003 | |
| WO | 200764209 | 6/2007 | |
| WO | 200807034 | 1/2008 | |
| WO | 201069910 | 6/2010 | |
| WO | 2010137990 | 12/2010 | |
| WO | 201126951 | 3/2011 | |
| WO | 2014155358 | 10/2014 | |

OTHER PUBLICATIONS

Emco Wheaton, A Gardner Denver Product, LNG Loading Arm, Product Data Sheet, 2 pages.
International Search Report and Written Opinion received for PCT Patent Application No. PCT/EP2014/072357, dated Feb. 16, 2015, 3 pages.
International Search Report and Written Opinion received for PCT Patent Application No. PCT/EP2014/060944, dated Sep. 5, 2014, 10 pages.

* cited by examiner

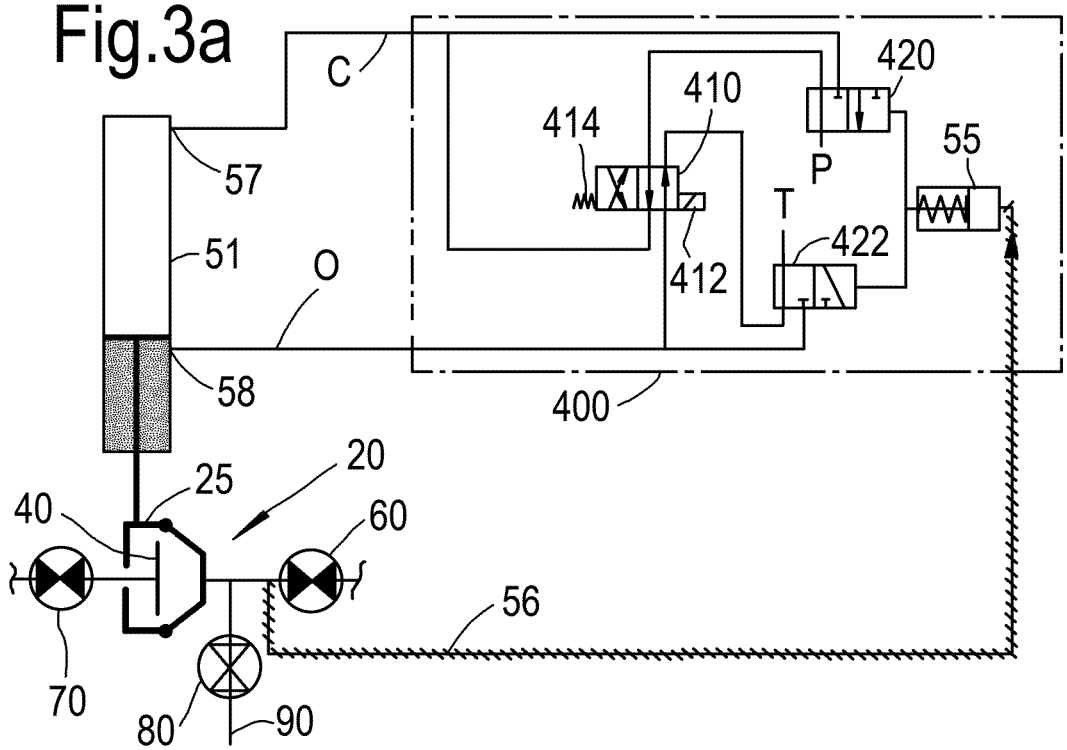
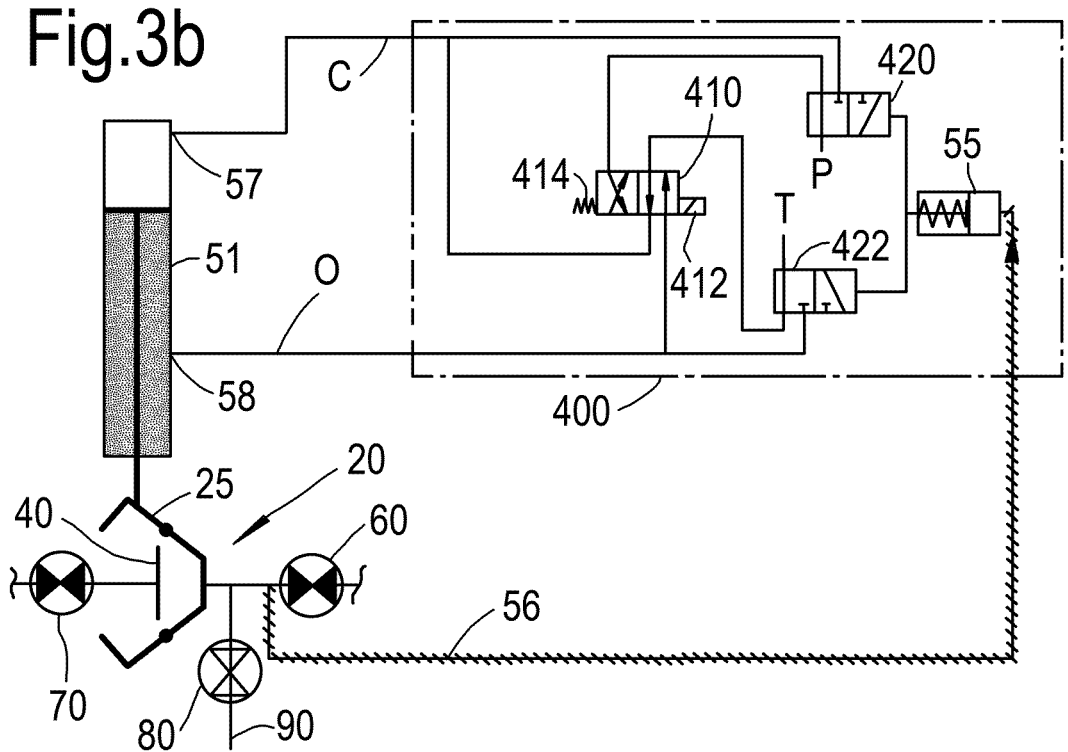

LOADING ASSEMBLY FOR CONVEYING A PRESSURIZED GAS STREAM AND A SWITCHING SYSTEM FOR USE IN A LOADING ASSEMBLY

In a first aspect, the present invention relates to a loading assembly for conveying a pressurized gas stream between a floating structure and another structure located adjacent to the floating structure. In another aspect, the present invention relates to a switching system for use in a loading assembly to operate an engagement mechanism of an emergency disconnection coupler.

The need for transferring pressurized gas between a floating structure and another structure may for instance arise if one of the structures comprises a gas processing unit, while the other contains either a gas consumer, a gas producer, or both. In the description below, it is assumed for the sake of illustration that the floating structure is the one that comprises such a gas processing unit, while the other structure has the consumer and/or the producer of gas. However, this is not a fixed requirement.

A pressurized gas may be transferred between the floating structure and the another structure by means of a so-called loading assembly. In essence, such loading assembly comprises a gas conduit that extends between the floating structure and the other structure, to convey a pressurized gas stream, such as a pressurized natural gas stream, between the two structures. If the loading assembly is adapted to convey pressurized gas, such loading assembly can for instance be used to off-load (discharge) the revaporized gas from a floating gasification unit (or a floating storage and gasification unit), or to load pressurized natural gas onto a floating gas processing unit such as a floating liquefaction unit (or a floating liquefaction and storage unit). Suitably, although this is not a requirement of the present invention, the gas conduit is supported on a loading arm. A number of companies, including FMC Technologies inc., Emco Wheaton and possibly others, manufacture and sell such loading arms for transferring pressurized gas. Loading assemblies for pressurized (natural) gas should not be confused with loading assemblies such as described in e.g. US pre-grant patent application publication No. 2006/0156744, which are designed to transfer the cryogenic liquid LNG. Transfer of (cryogenic) liquids is usually done under low pressure (lower than 5 barg) and thus the rating of connectors is different than for pressurized gas.

Systems and methods for dockside regasification of liquefied natural gas (LNG) are described in US pre-grant publication No. 2010/0263389. In these systems and methods, LNG may be provided from an LNG carrier to a regasification vessel. The LNG is regasified on the regasification vessel, and the regasified natural gas discharged with a high pressure arm to shore. A first end of the high pressure arm may include a quick release system involving an emergency release coupling (ERC). The ERC may be triggered to release if the motion of the high pressure arm exceeds one or more preset parameters in any direction.

However, there is a risk of uncontrolled loss of containment if the arm is not depressurized before releasing the ERC. Furthermore, there is a risk that the quick release system the trigger to release the ERC is not correctly issued, for instance due to do a loss of power.

In accordance with the first aspect of the present invention, there is provided a loading assembly for conveying a pressurized gas stream between a floating structure and another structure that is located adjacent to the floating structure, the loading assembly comprising:

a gas conduit that extends between the floating structure and the other structure, to convey a pressurized gas stream between the two structures;

an emergency disconnection coupler configured in the gas conduit for establishing a selectively connectable and disconnectable gas connection between the floating structure and the other structure through the gas conduit, wherein gas present in the gas connection has a gas pressure, and wherein the emergency disconnection coupler comprises an engagement mechanism that is selectively switchable between a locked position and an unlocked position, whereby in said locked position the gas connection is established and whereby in said unlocked position the gas connection is interrupted whereby the engagement mechanism physically disengages when the engagement mechanism is in the unlocked position;

an emergency disconnect power assembly functionally coupled to the engagement mechanism drive the switching of the engagement mechanism;

a switching system arranged between the emergency disconnect power assembly and the engagement mechanism, wherein the switching system is configured to control the switching of the engagement mechanism in the emergency disconnection coupler between the locked position and the unlocked position, wherein the switching system is subject to two distinct fail-safe regimes contingent upon the internal gas pressure in the gas connection: a fail-unlocked regime when the internal gas pressure in the gas connection is below a preselected override threshold value, which sets the switching system to unlock the engagement mechanism upon power loss, and a fail-locked regime which sets the switching system to lock the engagement mechanism when the internal gas pressure in the gas connection is at or above the preselected override threshold value.

In accordance with the second aspect of the invention, there is provided a switching system for use in a loading assembly to operate an engagement mechanism of an emergency disconnection coupler provided to establish a selectively connectable and disconnectable gas connection in a gas conduit for conveying a pressurized gas stream between a floating structure and another structure that is located adjacent to the floating structure, wherein the switching system is configured to control the switching of the engagement mechanism in the emergency disconnection coupler between a locked position and an unlocked position, wherein the switching system is subject to two distinct fail-safe regimes contingent upon a internal gas pressure in the gas connection: a fail-unlocked regime when the internal gas pressure in the gas connection is below a preselected override threshold value, which sets the switching system to unlock the engagement mechanism upon power loss, and a fail-locked regime which sets the switching system to lock the engagement mechanism when the internal gas pressure in the gas connection is at or above the preselected override threshold value.

Figure 2:
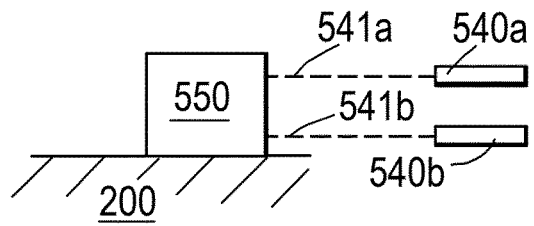
Figure 4:
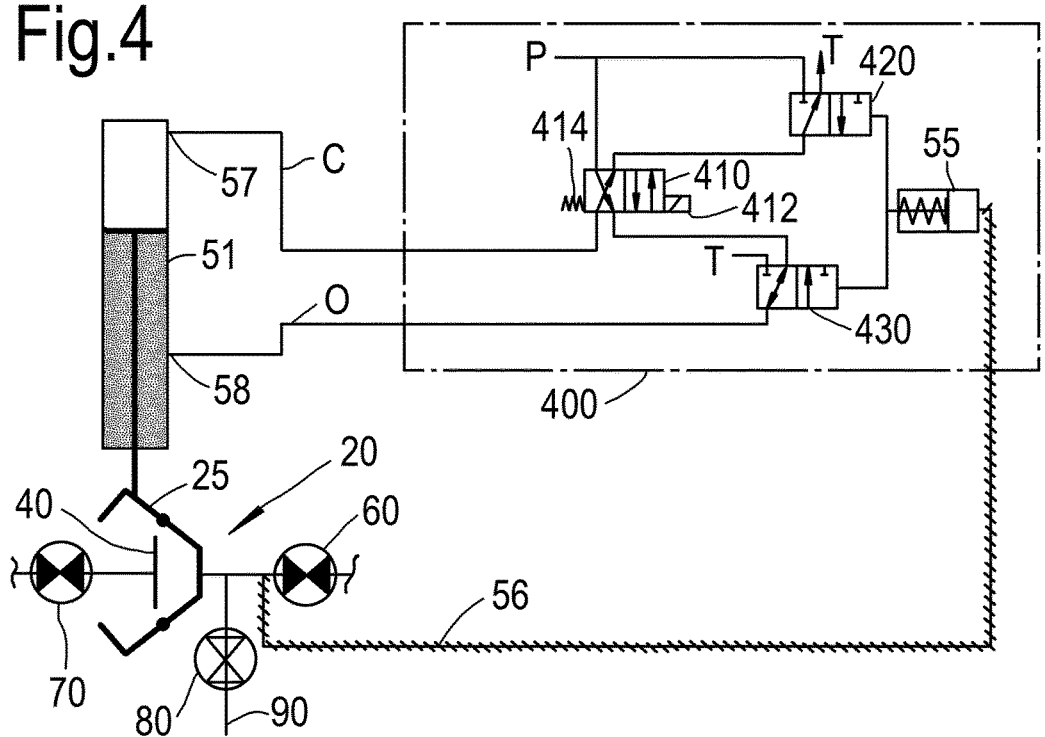
Figure 6:
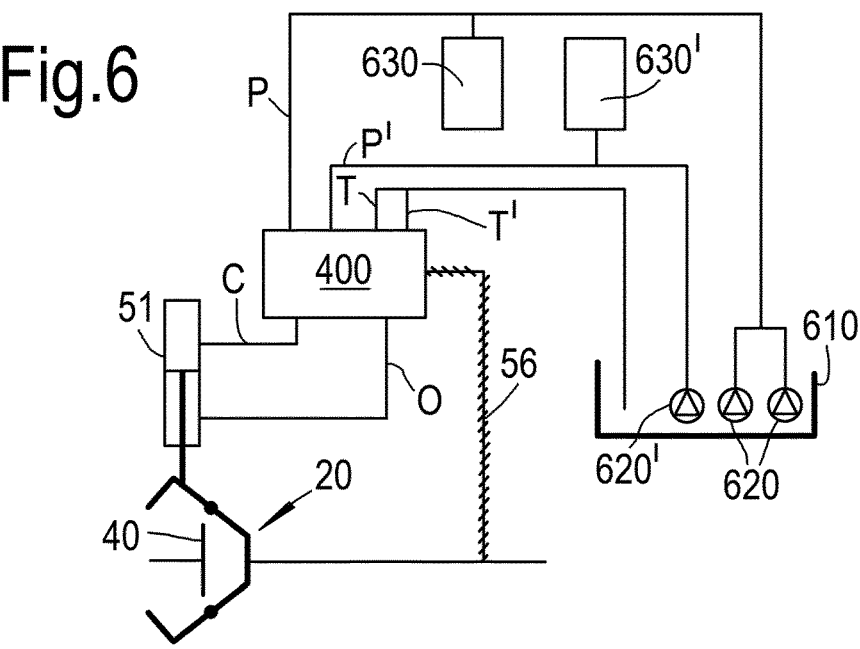
Figure 5A:
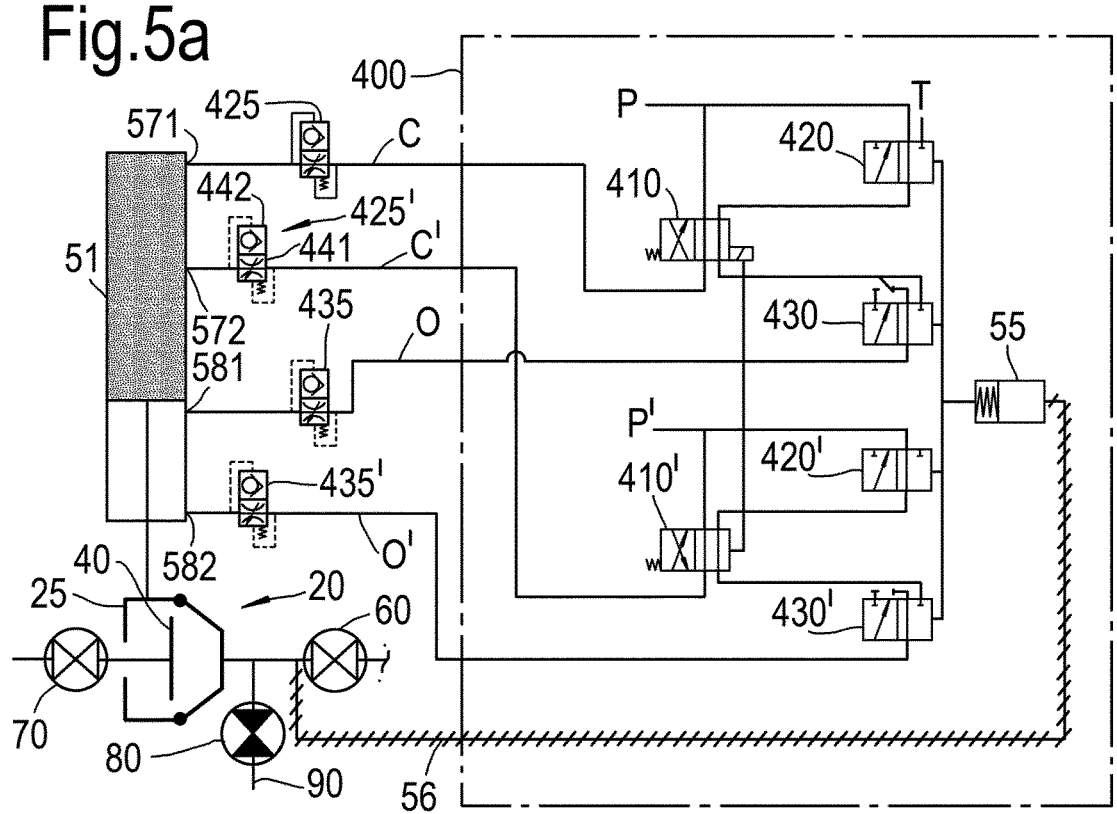
Figure 5B:
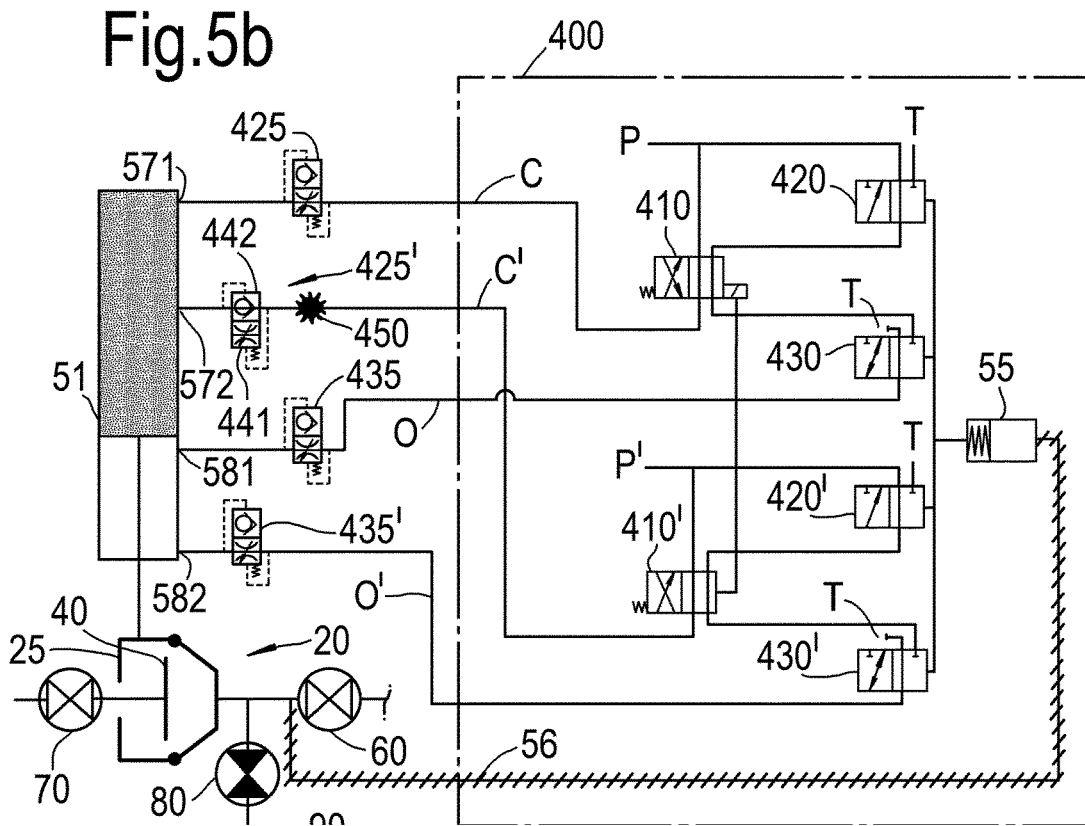
Figure 7:
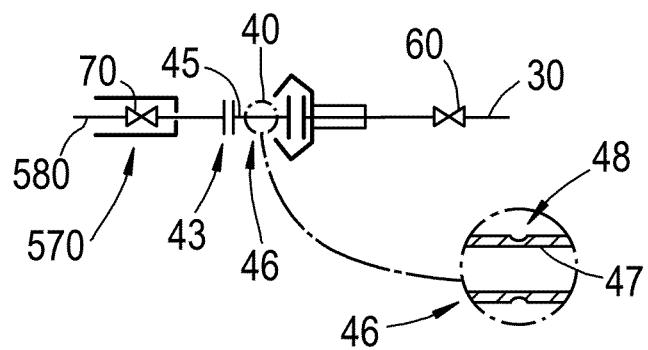
Figure 8:
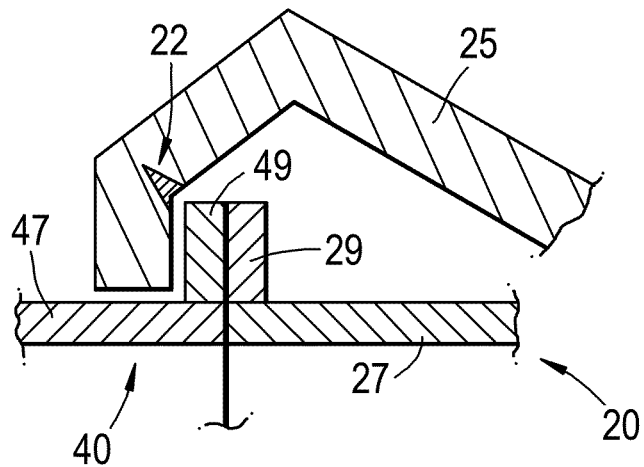
Figure 9:
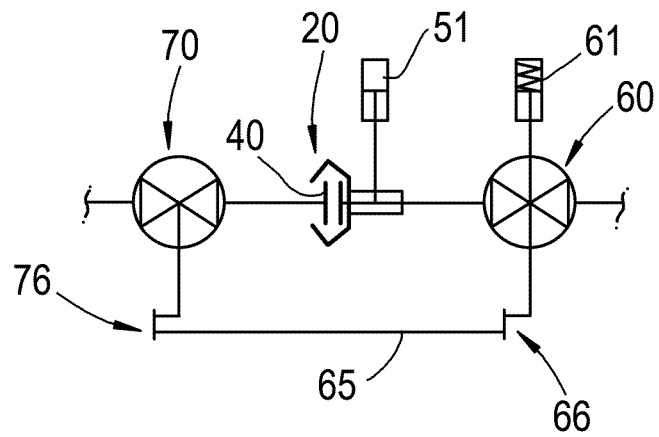

The invention will be further illustrated hereinafter by way of example only, and with reference to the non-limiting drawing in which;

FIG. 1 schematically shows a loading assembly incorporating the invention;

FIG. 2 schematically shows an embodiment of a main power assembly functionally connected to loading arm drive cylinders;

FIG. 3 (parts a to d) schematically illustrates a suitable switching system for use in the loading assembly, in four distinct conditions;

FIG. 4 schematically illustrates a suitable alternative switching system compared to FIG. 3;

FIG. 5 (parts a and b) schematically illustrate optional features that can be applied in suitable switching systems, including the switching systems of FIG. 3 and FIG. 4;

FIG. 6 schematically illustrates an example of a hydraulic power unit in a loading system;

FIG. 7 schematically shows a part of a loading assembly comprising an interface pipe piece provided with a breakaway weak link;

FIG. 8 schematically shows a part of an emergency disconnection coupler comprising an integrated breakaway weak link; and FIG. 9 schematically shows a part of a loading assembly comprising a mechanical link bar for actuating two isolation valves using a single valve actuator.

For the purpose of this description, a single reference number will be assigned to a line as well as a stream carried in that line. Same reference numbers refer to similar components. The person skilled in the art will readily understand that, while the invention is illustrated making reference to one or more a specific combinations of features and measures, many of those features and measures are functionally independent from other features and measures such that they can be equally or similarly applied independently in other embodiments or combinations.

An improved loading assembly is presently proposed for conveying a pressurized gas from a floating structure to another structure. The loading assembly comprises a gas conduit that extends between the floating structure and the other structure, to convey a pressurized gas stream between the two structures, and an emergency disconnection coupler configured in the gas conduit.

A switching system is provided for controlling switching of the engagement mechanism in the emergency disconnection coupler between a locked position and an unlocked position (in either direction). The switching system is subject to two distinct fail-safe regimes: one which inherently instructs for release of the emergency disconnection coupler upon power loss, and one which inherently precludes release of the emergency disconnection coupler when there is pressurized gas in the gas connection. The latter overrides the earlier mentioned.

In accordance with preferred embodiments of the invention, the switching system comprises a selection switch and a pressure gate comprising an override switch. The selection switch has an open state and a closed state. Upon selecting the open state the engagement mechanism is instructed to assume the unlocked position. Upon selecting the closed state the engagement mechanism is instructed to assume the locked position. The selection switch is of fail-open type. However, the selection switch can be overridden by the pressure gate.

The pressure gate is functionally connectable to the gas connection via a gate line to be driven by the internal gas pressure within the gas connection. The pressure gate comprises an override switch that is activatable by the internal gas pressure, wherein the override switch is forced in override position when the internal gas pressure is at or above a preselected override threshold value, in which case the pressure gate overrides the selection switch whereby, regardless of whether the selection switch is in open state or in closed state, the engagement mechanism is instructed to assume the locked position. Movement of the engagement mechanism from said locked position to said unlocked position can only proceed when the internal gas pressure in the gas connection is below said preselected override threshold value whereby the override switch is not activated.

Thus, the override switch and the selection switch are configured in a master-slave relationship, whereby the override switch functions as the master and the selection switch as the slave. Herewith there is provided a loading assembly with an emergency disconnection coupler that has two distinct fail-safe regimes. When the gas connection is not pressurized (more generally, when the internal gas pressure in the gas connection is below a preselected override threshold value), the emergency disconnection coupler is in a regime governed by the selection switch which is of fail-open type. This means that the selection switch is biased to assume its open state whereby the engagement mechanism is instructed to assume its unlocked position. However, whenever the internal gas pressure in the gas connection is at or above the preselected override threshold value, the selection switch is overridden by the action of the internal gas pressure.

Such a loading assembly and such a switching system can be used for transferring pressurized gas between the floating structure and the other structure in either direction. The need to transfer pressurized gas may for instance arise if one of the structures comprises a gas processing unit A floating structure comprising a gas processing unit may be referred to as floating gas processing unit. In the art, a floating gas processing unit usually comprises a floating hull provided with equipment for receiving natural gas in a starting condition, processing the natural gas, and subsequently discharging the natural gas in a processed condition, whereby the processed condition is different from the starting condition.

An example of a floating gas processing unit is a floating gasification unit (FGU). An FGU receives liquefied natural gas (LNG), which is natural gas in a cryogenic liquefied condition, and vaporizes the liquefied natural gas by adding heat to it, thereby changing the condition to a vapour. The natural gas is discharged in the form of a revaporized natural gas in vapour phase. The revaporized natural gas is typically piped from the FGU to shore, where the natural gas may be used in various ways. For example it may be added to a natural gas distribution grid. Usually the liquefied natural gas is pressurized before being vaporized, in which case the revaporized natural gas is pressurized. A floating gasification unit often has cryogenic storage capacity for (temporarily) storing the LNG prior to it being vaporized. Such a floating gasification unit with cryogenic storage capacity is typically referred to as a floating storage and regasification unit (FSRU). A non-limiting example is described in US pre-grant patent application publication No. 2006/0156744.

Another example of a floating gas processing unit is a floating natural gas liquefaction unit (FLU). Specific examples include floating natural gas liquefaction and storage units (FLSU) such as described in for instance WO 2007/064209 and WO 2010/069910. Such an FLU can be arranged to receive pressurized the natural gas from the other structure and to cryogenically cool the natural gas whereby liquefying the natural gas to produce LNG. In case of an FLSU, the LNG may be stored in cryogenic storage tanks before being off-loaded to an LNG tanker.

Although this is not a requirement of the invention, it is conceived that the loading assembly may comprise a loading arm extending between the floating structure and the other structure to support the gas conduit. Preferably on either side of the gas connection at least one isolation valve is configured in the gas conduit, whereby the gas connection is between these isolation valves. For ease of reference, these isolation valves will be referred to as spool-side isolation valve and arm-side isolation valve, although it is expressly stated that these terms "arm-side isolation valve" and "spool-side isolation valve" are not intended to infer that a spool and an arm are present. However, it is contemplated that many embodiments wherein the invention is implemented will have an arm and a spool, and thus these names have been given to the respective isolation valves. Furthermore, the loading assembly is further provided with a blow down valve that fluidly communicates with the gas connection via a blow down junction arranged in the gas connection between the spool-side isolation valve and the emergency disconnection coupler. Herewith it is possible to depressurize the gas connection, whereby lowering the internal gas pressure to below the preselected override threshold value, to bring the switching system in the fail-unlocked regime.

Preferably, each of the spool-side isolation valve and the arm-side isolation valve and the blow down valve are biased valves whereby the blow down valve is moved in open position when the blow down valve is unpowered, and the spool-side isolation valve is moved in closed position when the spool-side isolation valve is unpowered and the arm-side isolation valve is moved in closed position when the arm-side isolation valve is unpowered. This further facilitates the fail-safe configuration of the assembly in case of inadvertent loss of power.

A breakaway weak link may suitably be located within the gas connection between the spool-side isolation valve and the arm-side isolation valve. Herewith it can be ensured that the gas connection breaks open at a preconceived location between the spool-side isolation valve and the arm-side isolation valve, in case the mechanical load on the loading assembly, caused by relative movement between the floating structure and the other structure, exceeds a predetermined limit.

The isolation valves can be closed prior to reaching the predetermined limit of the mechanical loading and thus preventing loss of containment. Preferably the closure of the isolation valves is triggered by an over-reach sensor which determines the distance the loading assembly has to span between the floating structure and the other structure.

If a loading arm is provided, the base of the loading arm may be founded on the floating structure or on the other structure. The flow direction of the pressurized gas through the loading assembly may be from the proximal end to the distal end, or from the distal end to the proximal end.

In the drawings and description below, to avoid excessive proliferation of drawings and illustrations only the case wherein the base of the loading arm is founded on the other structure is expressly described, whereby the flow direction of the gas is assumed to be from the floating structure to the other structure. The skilled person will understand the that the invention is not limited to this particular application of the invention, and that the same principles as described below can be applied when the flow direction is from the other structure to the floating structure and/or in embodiments wherein the base of the loading arm founded on the floating structure. Furthermore, it is assumed that the floating structure is a floating gas processing unit but the invention is equally applicable if the other structure contains a gas processing unit, or none of both contain a gas processing unit.

FIG. 1 schematically shows a possible implementation of the loading assembly wherein a number of the proposed improvements are illustrated. Involved are a floating gas processing unit 100 and another structure 200 located adjacent to the floating gas processing unit 100, and a loading assembly for conveying a pressurized gas from the floating gas processing unit 100 to the other structure 200. The floating gas processing unit 100 comprises a floating hull 110 on which supports gas processing equipment to receive natural gas in a starting condition, to processes the natural gas, and to discharge the natural gas in a processed condition. The processed condition is different from the starting condition. The floating gas processing unit 100 is used as an illustration of a floating structure that floats in a body of water 4.

The other structure 200 may also be a floating structure, or it may be a fixed structure such as a structure with a foundation on shore adjacent to the body of water, or a structure with a foundation in the body of water such as a platform or a jetty. In the description following below, the other structure 200 will be referred to as shore side 200 to facilitate ease of reading, but the invention applies to any type of other structure as indicated above.

The loading assembly comprises a loading arm 500 mounted on a base 510 located on the shore side 200. Numerous types of loading arms 500 are known in the art, and the invention is not limited to any particular type. The loading arm 500 shown in FIG. 1 is an articulated loading arm having a plurality of articulates 520a, 520b, 520c, 520d which are pivotably connected one to another other by joints 530a, 530b, 530c. The pivoting movement of the articulates may be controlled by loading arm drive cylinders 540a, 540b. These are coupled to the loading arm 500 to move parts of the loading arm 500, for instance the plurality of articulates 520a-d, relative to each other.

As schematically illustrated in FIG. 2, a main power assembly 550 may be provided on the shore side 200 and functionally coupled to the loading arm drive cylinders 540a, 540b. Preferably, the main power assembly 550 comprises a main arm hydraulic power system that is connected to the loading arm drive cylinders 540a, 540b via a plurality of arm hydraulic lines 541a, 541b.

Referring again to FIG. 1, the loading arm 500 comprises a proximal end 560 at the base 510 and a distal end 570 reaching out from the base 510. A gas conduit 580 is mounted on the loading arm 500. The gas conduit 580 is represented as a line in the figure. The gas conduit may be formed of hard pipe ends joined together via swivels 590a, 590b, 590c in the joints 530a, 530b, 530c. Other types of gas conduits may be employed instead, such as for instance flexible gas conduits or hard pipe parts joined together with flexible parts. The gas conduit 580 serves to convey a pressurized gas stream from the distal end 570 of the loading arm to the proximal end 560.

A spool part is provided, which comprises a spool part conduit 30, and a gas connection can be established between the spool part and the proximal end 570 of the loading arm 500. The gas connection extends between the proximal end 570 of the loading arm and the spool part. When during operating the loading arm is connected to the spool part, the gas connection fluidly connects the gas conduit 580 on the loading arm 500 with the spool part conduit 30.

In the embodiment of FIG. 1, the spool part conduit 30 extends between a gas send out header 10 and a spool-side isolation valve 60, whereby pressurized gas can flow from the gas send out header 10 through the spool part conduit 30 and the spool-side isolation valve 60 into the gas connection. An arm-side isolation valve 70 separates the gas connection from the gas conduit 580 that is mounted on the loading arm 500. The spool-side isolation valve 60 may be mounted on the floating gas processing unit 100.

The spool-side isolation valve 60 may be operated by means of a spool-side isolation valve actuator 61. The arm-side isolation valve 70 may be operated by means of an arm-side isolation valve actuator 71. Closure of the isolation valves may be triggered by an over-reach sensor, which determines the distance the loading arm has to span between the floating gas processing unit and the other structure.

A blow down valve 80 may be provided in fluid communication with the gas connection via a blow down junction 85 that is arranged in the gas connection, which is established in a section of the spool conduit 30 between the spool-side isolation valve 60 and the arm-side isolation valve 70. The blow down valve 80 may be operated by means of a blow down valve actuator 81.

The gas connection comprises an emergency disconnection coupler which can be used in normal controlled operations to engage and disengage the loading arm 500 from the spool part. The emergency disconnection coupler typically comprises an actuated coupling part 20 and a passive coupling part 40. As shown in FIG. 1, the passive coupling part 40 and the actuated coupling part 20 of the emergency disconnect coupler are both arranged downstream of the spool-side isolation valve 60. The pressurized gas can thus flow from the gas send out header 10 through the spool-side isolation valve 60 and from there through the actuated and passive coupling parts of the emergency disconnect coupler to the arm-side isolation valve 70 and further into the gas conduit 580 on the loading arm 500.

The actuated coupling part 20 of the emergency disconnection coupler is arranged to cooperate with the loading arm 500 via a passive coupling part 40. The actuated coupling part 20 is configured to releasably lock against the passive coupling part 40, whereby in a locked position of the actuated coupling part 20 a fluid connection is established between a gas send out header 10 and the passive coupling part 40 via the spool part conduit 30 and the actuated coupling part 20. In an unlocked position of the actuated coupling part 20, the fluid connection is interrupted. The actuated coupling part 20 may be of a known type having a plurality of jaws pivotally coupled to a body and distributed around a circumference of the body. The jaws can physically clamp to the passive coupling part 40 when the jaws are moved into an engaged position whereby the actuated coupling part 20 is in its locked position. An non-limiting example is disclosed in U.S. Pat. No. 6,843,511, the description of which is incorporated herein by reference.

The passive coupling part 40 is mechanically released from the actuated coupling part 20 when the actuated coupling part 20 is in the unlocked position. This may be done in an emergency disconnect event, for instance when the floating gas processing unit 100 is adrift, or routinely as part of a normal operations whereby the loading arm 500 is to be released from the floating gas processing unit 100 by free choice of the site operator. The passive coupling part 40 may be retained on the distal end 570 of the loading arm 500.

Regardless of whether the spool part forms part of the floating gas processing unit 100 or the other structure 200, the actuated coupling part 20 preferably stays mechanically connected to the spool part conduit 30, regardless of whether the actuated coupling part 20 is in its locked or unlocked position. In the embodiment of FIG. 1, the gas send out header 10, the actuated coupling part 20 and the spool part all are mounted on the floating gas processing unit 100, as schematically illustrated by mounting stud 120. Multiple mounting studs may be used.

Preferably the blow down junction 85 is configured between the spool-side isolation valve 60 and the actuated coupling part 20. The blow down valve 80 is suitably arranged in a blow down line 90 which is fed from the gas connection via the blow down junction 30. The blow down line 90 fluidly connects the gas connection to a first vent stack 140 that is provided on the floating gas processing unit 100. This provides the option for the gas connection between the spool-side isolation valve 60 and the arm-side isolation valve 70 to be selectively vented prior to selectively switching of the actuated coupling part 20 from the locked to the unlocked position. An advantage of the first vent stack 140 being available on the floating gas processing unit 100 is that no blow down line needs to be incorporated in the loading arm. Herewith, not only can associated swivels be avoided, but also, by arranging the first vent stack 140 on the floating gas processing unit 100, the blow down line 90 to first vent stack 140 can be arranged less exposed to, and better protected from, external sources of damage than is possible on the loading arm and on the shore side 200. Suitably, the spool-side isolation valve 60 and the arm-side isolation valve 70 are both closed prior to opening the blow down valve 80 to vent the gas connection.

In addition to the spool-side isolation valve 60, an auxiliary spool-side isolation valve 160 may be configured in the spool part conduit 30. The auxiliary spool-side isolation valve 160 may be operated by means of an auxiliary spool-side isolation valve actuator 161. The auxiliary spool-side isolation valve 160 may be configured between the gas send out header 10 and the spool-side isolation valve 60. Similar to the blow down valve 80, an auxiliary blow down valve 180 may also be provided, which may be operated by means of an auxiliary blow down valve actuator 181. The auxiliary blow down valve 180, if provided, fluidly communicates with the spool part conduit 30 via an auxiliary blow down junction 185 arranged in the spool part conduit 30 between the auxiliary spool-side isolation valve 160 and the spool-side isolation valve 60. The auxiliary blow down valve 180 may be configured in an auxiliary blow down line 190, which may ultimately vent into the first vent stack 140 or another, a second, vent stack provided on the floating gas processing unit 100 (not shown).

The actuated coupling part 20 forms part of an engagement mechanism, which further comprises at least one coupling part actuator 51. The engagement mechanism is selectively switchable between a locked position and an unlocked position, wherein in the locked position the gas connection is established and whereby in unlocked position the gas connection is interrupted whereby the engagement mechanism physically disengages when in the unlocked position. FIG. 1 further shows an emergency disconnect power assembly 50 that is mounted on the floating gas processing unit 100. The emergency disconnect power assembly 50 is operatively connected to the engagement mechanism to power the engagement mechanism to selectively switch the actuated coupling part 20 from the locked position to the unlocked position. Optionally, the same emergency disconnect power assembly 50 can be employed to selectively switch the engagement mechanism from the unlocked position to the locked position. In the latter case the emergency disconnection coupler can advantageously be used for coupling and de-coupling the loading assembly to the gas send out header 10 of the floating gas processing unit 100 during normal (planned) operations while at the same time having the emergency functionality available.

The emergency disconnect power assembly 50 may be of any desired suitable type. In a preferred embodiment, it takes the form of a hydraulic power unit, which is operatively connected to the actuated coupling part 20 by means of at least one hydraulic line. Optionally, multiple hydraulic lines are connected to the emergency disconnect power assembly 50. For the purpose of maintaining clarity in FIG. 1, the hydraulic lines are represented by dashed lines by which they can easily be distinguished from other lines. There is a pressure line P, which is fluidly connected to a high-pressure discharge of a pump (not shown) and/or of a pressure accumulator (not shown) capable of providing a selected volume of hydraulic fluid at a pressure exceeding a preselected minimum pressure. A hydraulic return line T may be led to a hydraulic fluid storage tank (not shown). The pump may be fed from the hydraulic fluid storage tank, thus closing a hydraulic power loop. Low-pressure means lower than the pressure applied in the pressure line P.

A switching system 400 is arranged between the emergency disconnect power assembly 50 and the engagement mechanism associated with the activated coupling part 20 of the emergency disconnection coupler. The switching system 400 is configured to control the switching of the engagement mechanism in the emergency disconnection coupler between the locked position and the unlocked position (in either direction).

Typically the switching system 400 comprises a selection switch, which may be operator operated, to instruct locking or unlocking of the engagement mechanism. The selection switch has an open state and a closed state. When the open state is selected, the engagement mechanism is instructed to assume the unlocked position. Conversely, upon selecting the closed state the engagement mechanism is instructed to assume the locked position.

If the power used to operated the selection switch drops out for some reason, the emergency disconnection coupler should disengage unless there is pressurized gas in the gas connection. If there is pressurized gas in the gas connection, the emergency disconnection coupler should never be allowed to disengage, whether it by accidental erroneous control instruction or by a system failure.

In accordance with aspects of the present invention, the switching system has two distinct fail-safe regimes, conditional on the internal gas pressure available in gate line 56: a fail-unlocked regime, which instructs for disconnection of the emergency disconnection coupler (involving bringing the engagement mechanism in the unlocked position) unless the selection switch is in the open state, and a fail-locked regime which inherently precludes release of the emergency disconnection coupler when there is pressurized gas in the gas connection regardless of the state of the selection switch. In the fail-locked regime the engagement mechanism is instructed to assume its locked position regardless of whether the selection switch is in its open state or in its closed state. The latter overrides the earlier mentioned.

The engagement mechanism may be powered by any suitable means. For the remainder of this description it will be assumed that the coupling part actuator 51 is powered hydraulically employing hydraulic means. This may be any device capable of transferring hydraulic power to motion. Examples include a hydraulic piston device, or one or more hydraulic motors. Suitably the hydraulic means can be operated bi-directionally. In the drawings herein the coupling part actuator 51 is represented by a double effect hydraulic piston actuator. The hydraulically powered coupling part actuator 51 in FIG. 1 is connected to the hydraulic power unit via two hydraulic lines: a pressure-to-close line C and a pressure-to-open line O. This means that if there is sufficient positive pressure differential between the pressure-to-close line C and the pressure-to-open line O the engagement mechanism will be forced to its locked position, whereas the engagement mechanism will be forced to its unlocked position if there is sufficient negative pressure differential between the pressure-to-close line C and the pressure-to-open line O. Sufficient in this context means high enough to overcome counter forces including friction forces.

Adapted for embodiments employing a hydraulic power unit, the switching system 400 is functional to connect the pressure line P from the hydraulic power unit to the pressure-to-close line C in order to instruct the engagement mechanism of the emergency disconnection coupler to assume the locked position. In order to instruct the engagement mechanism of the emergency disconnection coupler to assume the unlocked position, the switching system connects the pressure line P of the hydraulic power unit to the pressure-to-open line O.

Suitably, the switching system 400 may, preferably simultaneously to connecting the pressure line P from the hydraulic power unit to the pressure-to-close line C, connect hydraulic return line T to the pressure-to-open line O when instructing the engagement mechanism of the emergency disconnection coupler to assume the locked position. Conversely, the switching system 400 may, preferably simultaneously to connecting the pressure line P from the hydraulic power unit to the pressure-to-open line O, connect hydraulic return line T to the pressure-to-close line C when instructing the engagement mechanism of the emergency disconnection coupler to assume the unlocked position. This facilitates establishing the desired positive or negative pressure differential between the pressure-to-close line C and the pressure-to-open line O to force the engagement mechanism into the desired position.

The selection switch is of fail-open type, meaning that it is biased towards the open state. In addition, the switching system 400 comprises a pressure gate. The pressure gate is functionally connected to the gas connection, via a gate line 56. The pressure gate is driven by the internal gas pressure in the gas connection which acts on the pressure gate via the gate line 56. The selection of the state of the selection switch only has effect on the position of the engagement mechanism when the pressure in the gate line 56 is below a pre-selected override threshold value. When the pressure in the gate line 56 is at the pre-selected override threshold value or higher, then pressure gate determines the outcome of the switching system. The state of the selection switch will be moot in that case, as the pressure gate overrides the selection switch.

In one group of embodiments, the emergency disconnect power assembly 50 may be provided to exclusively power said selective switching, in which case a separate valve power assembly could be provided to power at least the spool-side isolation valve 60 and the blow down valve 80, and optionally also the arm-side isolation valve 70. This is illustrated in FIG. 1, wherein a spool-side isolation valve hydraulic line 62 is provided to power the spool-side isolation valve 60 and wherein a blow down valve hydraulic line 82 is provided to power the blow down valve 80 and wherein an arm-side isolation valve hydraulic line 72 is provided to power the arm-side isolation valve 70. A quick connection port 73 is preferably provided in the arm-side isolation valve hydraulic line 72, allowing to disconnect the hydraulic connection between the emergency disconnect power assembly 50 and the arm-side isolation valve 70, so that the loading arm 500 can safely disengage from the floating gas processing unit 100 and be moved away from the floating gas processing unit 100. It should be noted, however, that with the loading arrangement of the invention such quick connection ports are not necessary in the at least one hydraulic line to the actuated coupling part 20 as the actuated coupling part 20 can stay on the floating gas processing unit 100 in the case of a loading arm disconnect event.

Alternatively (not shown), at least the spool-side isolation valve 60 and the blow down valve 80, and optionally also the arm-side isolation valve 70, are operably connected to another power system available in addition to the emergency disconnect power assembly 50. This may be another hydraulic power system for hydraulically powering these valves, or, for instance, an instrument air system may be employed for pneumatically powering these valves. The instrument air system may be present on the floating gas processing unit 100 anyway, for pneumatically operating other instruments on the floating gas processing unit 100 that do not form part of the loading assembly.

The spool-side isolation valve 60 and the arm-side isolation valve 70 and the blow down valve 80 preferably all are fail-safe valves. Fail-safe valves are valves that are biased to move to or stay in a predetermined fail position (open or closed) in case power is lost. For the spool-side isolation valve 60 and the arm-side isolation valve 70 the preferred fail position is closed (so-called fail-close valves), whereby the spool-side isolation valve 60 is biased to move (and/or stay) in closed position when the spool-side isolation valve 60 becomes unpowered and the arm-side isolation valve 70 is biased to move (and/or stay) in closed position when the arm-side isolation valve 70 becomes unpowered. The blow down valve preferably is a fail-open valve, which is biased to move (and/or stay) in open position when the blow down valve becomes unpowered.

Fail-safe valves may comprise actuators that are biased to inherently leave the valve in the predetermined fail position in case power to the actuator is lost. The actuators may for instance be spring-biased.

For instance, if in case the power supply is a hydraulic or a pneumatic one, the spool-side isolation valve actuator 61 and the arm-side isolation valve actuator 71 may both be a spring biased piston actuator in which a spring mechanically interacts with a piston whereby spring action on the piston causes the valve concerned to close and whereby the valve is opened by hydraulically or pneumatically forcing the piston against the spring. In the embodiment of FIG. 1, the spool-side isolation valve actuator 61 is operably connected to the spool-side isolation valve hydraulic line 62, whereby the spool-side isolation valve 60 is opened by hydraulically forcing a spool-side isolation valve piston against a spool-side isolation valve biasing spring within the spool-side isolation valve actuator 61. Likewise, the arm-side isolation valve actuator 71 is operably connected to the arm-side isolation valve hydraulic line 72, whereby the arm-side isolation valve 70 is opened by hydraulically forcing an arm-side isolation valve piston against an arm-side isolation valve biasing spring within the arm-side isolation valve actuator 71. The blow down valve 80, which preferably is a fail-open valve, may be closable by hydraulically forcing a blow down valve piston against a blow down biasing spring within the blow down valve actuator 81. The blow down valve actuator 81 may be operably connected to the blow down valve hydraulic line 82.

Similarly, the optional auxiliary spool-side isolation valve 160 and optional auxiliary blow down valve 180 may be configured in the form of fail-safe valves, preferably whereby the optional auxiliary spool-side isolation valve 160 is of fail-close type and whereby the optional auxiliary blow down valve 180 is of fail-open type. In one example, as shown in FIG. 1, the auxiliary spool-side isolation valve actuator 161 is operably connected to an auxiliary spool-side isolation valve hydraulic line 162 and the auxiliary blow down valve actuator 181 is operably connected to an auxiliary blow down valve hydraulic line 182. In this case the auxiliary spool-side isolation valve 160 is opened by hydraulically forcing an auxiliary spool-side isolation valve piston against an auxiliary spool-side isolation valve biasing spring within the auxiliary spool-side isolation valve actuator 161; whereas the auxiliary blow down valve 180 is closed by hydraulically forcing an auxiliary blow down valve piston against an auxiliary blow down biasing spring within the auxiliary blow down valve actuator 181.

On the shore side 200, the loading assembly may further comprise a shore connection conduit 230 fluidly connected to the loading arm's gas conduit 580 at the proximal end 560 of the loading arm 500. The shore connection conduit 230 generally functions to fluidly connect the gas conduit 580 of the loading arm 500 to a shore gas distribution arrangement 210, which may comprise a gas distribution header connected to one or more gas pipelines and/or a gas grid.

An auxiliary arm-side isolation valve 270 may be configured in the shore connection conduit 230. Furthermore, a gas conduit blow down valve 280 may be fluidly connected to the shore connection conduit 230 via a gas conduit blow down junction 285 that is arranged between the arm-side isolation valve 70 (usually positioned at the distal end 570 of the loading arm 500) and the auxiliary arm-side isolation valve 270. Preferably, the gas conduit blow down junction 285 is arranged in the shore connection conduit 230 between the proximal end 560 of the loading arm 500 and the auxiliary arm-side isolation valve 270. With this shore arrangement it is possible to selectively vent the entire gas conduit 580 on the loading arm 500 and at least part of the shore connection conduit 230. Preferably, the gas conduit blow down valve 280 is (only) opened when the arm-side isolation valve 70 and the auxiliary arm-side isolation valve 270 are both closed. The gas conduit blow down valve 280 is suitably arranged in a gas conduit blow down line 290, which is fed from the shore connection conduit 230 via the gas conduit blow down junction 285. The gas conduit blow down line 290 suitably connects the shore connection conduit 230 to an optional third vent stack 240 that is provided on the shore side 200.

The auxiliary arm-side isolation valve 270 may be operated by means of an auxiliary arm-side isolation valve actuator 271. The gas conduit blow down valve 280 may be operated by means of gas conduit blow down valve actuator 281. These actuators may be hydraulically driven actuators, preferably similar to those for the auxiliary spool-side isolation valve 160 and the auxiliary blow down valve 180. Particularly, the auxiliary arm-side isolation valve actuator 271 is connected to a shore power unit 250 via an auxiliary arm-side isolation valve hydraulic line 272, and the gas conduit blow down valve actuator 281 is connected to the shore power unit 250 via a gas conduit blow down valve hydraulic line 282. The shore power unit 250 may be configured in the form of a stand-alone hydraulic power unit. Alternatively, the main power assembly 550 (illustrated in FIG. 2) may fulfil the function of shore power unit 250 by powering the auxiliary arm-side isolation valve 270 and the gas conduit blow down valve 280 together with powering the loading arm drive cylinders 540a, 540b.

The movement of the engagement mechanism from the locked position to the unlocked position is interlocked to avoid that said movement is possible when the gas within the gas connection is pressurized at or above a predetermined override threshold pressure. This is the fail-locked regime. The interlocking is pressure controlled, by the internal pressure inside the gas connection suitably between the spool-side isolation valve 60 and the arm-side isolation valve 70. Herewith spurious opening of the emergency disconnection coupler during normal pressurized gas transferring operations, by mistake, can be avoided.

A pressure-controlled software interlock may for instance be provided in the switching system, which overrides an emergency disconnection coupler opening signal as long as an internal pressure in the gas connection is at or above a predetermined override threshold value. The internal pressure in the gas connection may be measured using one, or preferably multiple, pressure sensors. In one embodiment, two pressure sensors are provided and a two out of two voting logic is applied to the two pressure sensors to decide whether the internal pressure is below the predetermined override threshold value. If desired, other numbers of pressure sensors may be employed and/or other voting logic such as two out of three or three out of three, for example.

The predetermined override threshold value may be set at 5 barg (bar gauge). Other override threshold values may be employed if desired, whereby a balance should be considered between the time it takes to vent the gas connection before the emergency disconnection coupler can actually disengage, and the maximum amount of release of gas that can be tolerated. One can go as low as, for instance 1 barg for the override threshold value, if desired to bring down the maximum amount of gas that can be released into the atmosphere.

Regardless of whether such a software interlock is provided, it is presently proposed in preferred embodiments of the invention to provide for a physical interlocking arrangement. Such physical interlocking may comprise a pressure gate that is driven by the internal gas pressure within the gas connection, preferably between the spool-side isolation valve 60 and the arm-side isolation valve 70. The intent of the pressure gate is to physically block movement of the engagement mechanism from the locked position to the unlocked position by default whenever the internal gas pressure in the gas connection is at or above the preselected override threshold value, whereby this movement can only proceed when the internal gas pressure in the gas connection is below the preselected override threshold value.

The pressure gate of such a physical interlocking arrangement may comprise an override switch that is arranged in the switching system 400. An example is shown in FIG. 3, wherein parts a to d illustrate a switching system 400, and its interaction with the engagement mechanism, in four distinct conditions.

Common to all parts a to d of FIG. 3, there is shown the actuated coupling part 20 and the passive coupling part 40 of the emergency disconnection coupler. The passive coupling part 40 and the actuated coupling part 20 of the emergency disconnect coupler between the spool-side isolation valve 60 and the arm-side isolation valve 70 to form the gas connection there between. A blow down valve 80 is provided in a blow down line 90 in fluid communication with the gas connection as described above. These valves are fail-safe valves. Open condition of any of these three valves is symbolized by light bow-tie symbols, while closed condition is symbolized by dark bow-tie symbols.

The figure also shows schematic representations of the interaction between the passive coupling part 40 and the actuated coupling part 20. The actuated coupling part 20 comprises including a mechanical jaw 25. A plurality of such jaws may typically be comprised in the emergency disconnection coupler, distributed along the circumference of the gas connection. Also shown is a coupling part actuator 51, which mechanically interacts with the jaw 25. The jaw 25 serves to releasably clamp the actuated coupling part 20 against the passive coupling part 40 when in the locked position, such as for example shown in FIG. 3a. FIG. 3b shows the jaw 25 in unlocked position.

The coupling part actuator 51 has been represented as a hydraulically powered actuator, powered by a hydraulic fluid. In FIG. 3 it is symbolized by a double-action piston but it does not have to a double-action piston. For instance it may be a bi-directional hydraulic motor, or a sets of counteracting uni-directional hydraulic motors. Regardless of the type of hydraulically powered actuator used, it comprises a first hydraulic communication port 57 through which the hydraulic fluid can pass, and a second hydraulic communication port 58 through which the hydraulic fluid can pass. A positive pressure differential between the first hydraulic communication port 57 and the second hydraulic communication port 58 causes a driving force on the engagement mechanism directed from the unlocked position towards the locked position. A negative pressure differential between the first hydraulic communication port 57 and the second hydraulic communication port 58 causes an opposite driving force on the engagement mechanism directed from the locked position to the unlocked position. Thus, the pressure-to-close line C should be fluidly connected to the first hydraulic communication port 57, and the pressure-to-open line O should be fluidly connected to the second hydraulic communication port 58.

The switching system 400 is configured between the coupling part actuator 51 and the hydraulic power unit. The hydraulic power unit itself is not shown in FIG. 3, but the interfaces with the pressure line P and the hydraulic return line T are indicated. Hydraulic lines that are in open connection with the pressure line P are represented thicker than hydraulic lines that are in open connection with the hydraulic return line.

The selection switch has an open state and a closed state. In the open state, the engagement mechanism is instructed to assume the unlocked position, whereas in the closed state the engagement mechanism is instructed to assume the locked position. The selection switch in FIG. 3 is provided in the form of a first directional control valve 410. In this particular example the first directional control valve 410 is a two-position, four port valve. In one position, which corresponds to the closed state of the selection switch, the pressure line P is brought in fluid connection with the pressure-to-close line C while the hydraulic return line T is brought in fluid connection with the pressure-to-open line O. This state is shown in FIG. 3a. In the other position, which corresponds to the open state of the selection switch, the pressure line P is brought in fluid connection with the pressure-to-open line O while the hydraulic return line T is brought in fluid connection with the pressure-to-close line C. This is shown in FIG. 3b. This can be achieved by straight connecting two ports of the four port valve with two other ports of the four port valve in one of the positions and cross connecting ports in the other of the positions.

The first directional control valve 410 can be actuated in any suitable way, including manually operated, mechanically, hydraulically operated, solenoid operated. For use in the loading assembly, solenoid operated is the preferred option as indicated by solenoid 412. Regardless of the actuation method, preferably the first directional control valve 410 is spring biased towards the open state of the selection switch, indicated by spring 414. This means that in order to bring the first directional control valve 410 in the closed state the valve has to be forced continuously against the spring 414, e.g. by continuously powering the solenoid. In case of loss of power to the solenoid, the first directional control valve 410 will inherently switch back to the open state. This is a fail-open selection switch.

The switching system 400 in FIG. 3 is furthermore provided with an override switch. The override switch has an activated position and a release position. In this particular example, the override switch comprises a second directional control valve 420 and a third directional control valve 430, whereby the second directional control valve 420 and the third directional control valve 430 are simultaneously actuated. In the figures the second and third directional control valves are represented as separate valves, but in practice they may be configured in one housing on a single spool. The spool may be sliding or rotary, preferably sliding.

Each of the second directional control valve 420 and the third directional control valve 430 is a two position three port valve. One of the two positions corresponds to the release position, in which release position the second directional control valve 420 connects the pressure line P to one of the ports of the first directional control valve 410 while at the same time the third directional control valve 430 connects the hydraulic return line T to another one of the ports of the first directional control valve 410. The pressure-to-close line C is also connected to another port of the second directional control valve 420 thereby connecting the other port of the second directional control valve 420 to the first hydraulic communication port 57 without passing through the first directional control valve 410. However, in the release position the other port of the second directional control valve 420 is connected to a blind. The pressure-to-open line O is also connected to another port of the third directional control valve 430, thereby connecting the other port of the third directional control valve 430 to the second hydraulic communication port 58 without passing through the first directional control valve 410. However, in the release position the other port of the third directional control valve 420 is connected to a blind.

In the conditions of FIGS. 3a and 3b, the override switch is in the release position and hence the open fluid connections between the hydraulic power unit and the hydraulic coupling part actuator 51 pass through the first directional control valve 410 allowing selective switching of the engagement mechanism between the locked and the unlocked positions.

Figure 3C:
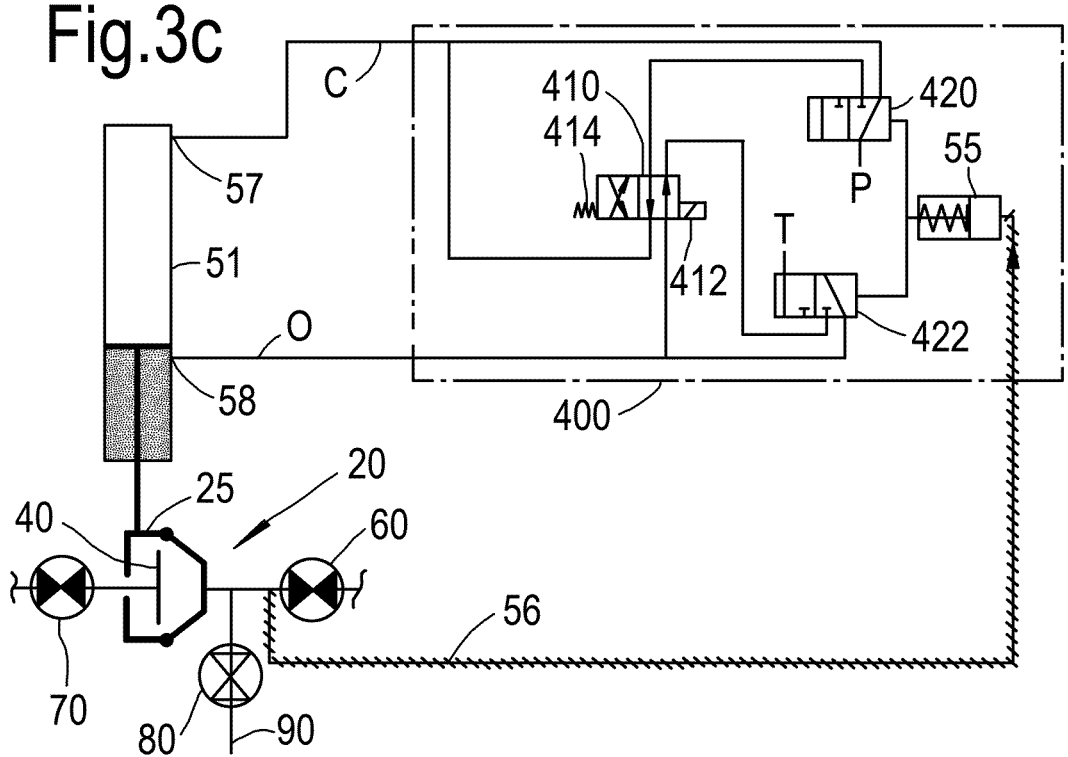
Figure 3D:
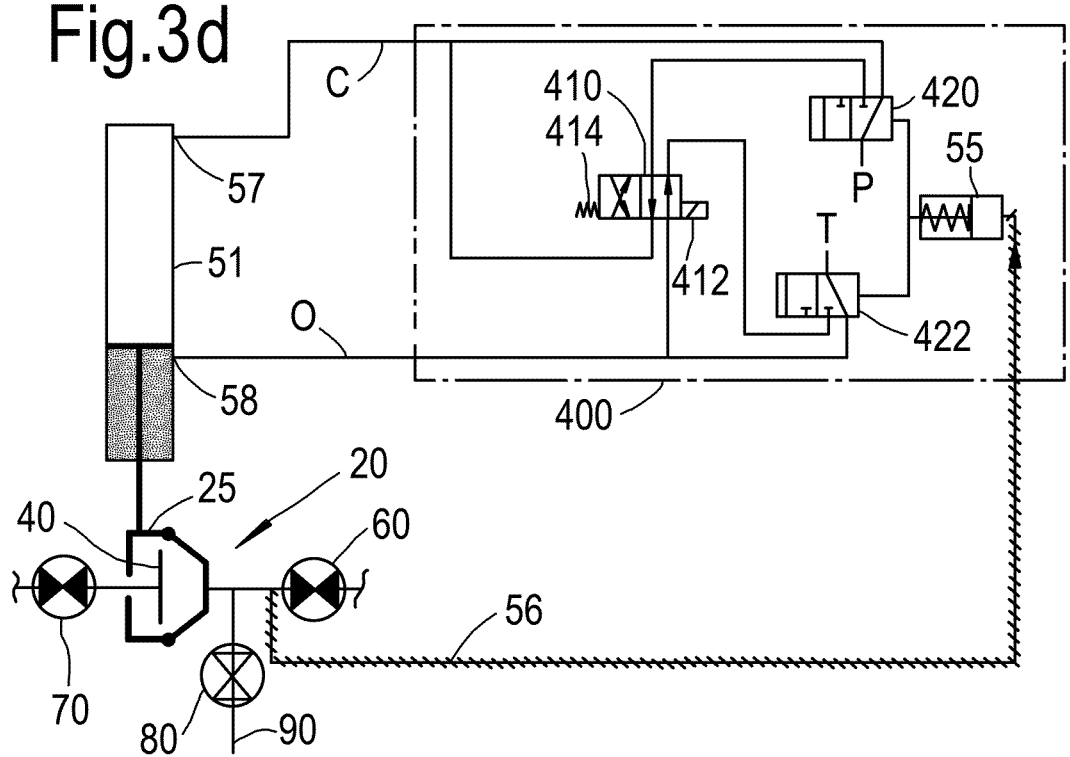

However, in FIGS. 3c and 3d the override switch is in activated position. In this position the second directional control valve 420 connects the pressure line P directly to the pressure-to-close line C to the first hydraulic communication port 57 without passing through the first directional control valve 410. The port of the first directional control valve 410 that is also connected to the second directional control valve 420 is now connected to the blind. At the same time the third directional control valve connects the hydraulic return line T directly to the second hydraulic communication port 58 without passing through the first directional control valve 410. The port of the first directional control valve 410 that is also connected to the third first directional control valve 430 is now connected to the blind.

As a result, the pressure-to-close line C will be connected to the pressure line P and the pressure-to-open line O will be connected to the hydraulic return line T regardless of the position of the selection switch. This means that, even if actuation power is lost to the selection switch, the engagement mechanism will continue to be instructed to assume its locked position. This corresponds to the fail-locked regime.

In this particular example the override switch is pneumatically actuated using a spring-return pneumatic actuator 55. The spring-return pneumatic actuator 55 is connected to the gas connection between the spool-side isolation valve 60 and the arm-side isolation valve 70 via the gate line 56. The advantage is that the override switch will be inherently activated as long as the internal gas pressure in the gas connection is at or above the preselected override threshold value. However, as soon as the internal pressure is below the override threshold value the override switch automatically goes into the release position as a result of the bias force provided by the loading spring, so that an emergency disconnect can be executed whereby instructing the engagement mechanism to unlock.

The following table summarizes the conditions of parts a to d in FIG. 3. A "+" symbol indicates that the internal gas pressure in the gas connection is at or above the override threshold value, a "–" means internal gas pressure in the gas connection is below the override threshold value.

TABLE 1

|  |  | State of selection switch | |
|---|---|---|---|
|  |  | Closed | Open |
| Internal gas pressure | – | FIG. 3a<br>EDC locked | FIG. 3a<br>EDC unlocked |
|  | + | FIG. 3c<br>EDC locked | FIG. 3D<br>EDC locked |

The preselected override threshold value may be set independently from other override pressure values such as the override threshold value of any optional software interlock if such is provided. The preselected override threshold value may for instance be set at 5 barg. One can go as low as, for instance 1 barg for the preselected override threshold value, but the consequence of a lower override threshold is that the time it takes to depressurize (blow down) the gas connection becomes longer.

If a software interlock is applied in addition to the physical interlock, it is recommended that the preselected override threshold for the physical interlock is the same or higher than the software override threshold value.

The configuration of the switching system 400 as illustrated in FIG. 3 is not the only possible configuration for a hydraulically powered coupling part actuator 51. As an example, one alternative is illustrated in FIG. 4. Only one condition is depicted, corresponding to the condition of FIG. 3b, but the other conditions can easily be worked out. As in FIG. 3, the switching system 400 of FIG. 4 also has the selection switch in the form of the first directional control valve 410, and the override switch comprising simultaneously operated second directional control valve 420 and third directional control valve 430 actuated in the same way as in FIG. 3 However, the hydraulic lines follow different paths through the various directional control valves. Notwithstanding, the switching system 400 of FIG. 4 also behaves according to the four states as set forth in Table 3.

The loading assembly can be made even more reliable by building in redundancy. This is illustrated by way of example in FIG. 5. Although the internal configuration of the switching system 400 corresponds to the one of FIG. 4, the same principles can be applied to other internal configurations including the one illustrated in FIG. 3. FIG. 5 has two parts, both in the condition corresponding to FIG. 3 part c.

Part a shows the normal operation, part b shows operation during a failure wherein a hydraulic line has ruptured.

Embodiments with redundancy can preferably be used when the loading assembly comprises a backup hydraulic circuit and a backup hydraulic power unit, in addition to the hydraulic circuit and the hydraulic power unit. The switching system 400 is configured between the coupling part actuator 51 and the hydraulic power unit as well as between the coupling part actuator 51 and the backup hydraulic power unit. The backup hydraulic power unit itself is not shown in FIG. 5, but the interfaces with the backup pressure line P' and the backup hydraulic return line T' are indicated, as well as interfaces with the pressure line P and the hydraulic return line T. As with FIG. 3, hydraulic lines that are in open connection with the pressure line P or the backup pressure line P' are represented thicker than hydraulic lines that are in open connection with the hydraulic return line T or the backup hydraulic return line T'.

The selection switch comprises a backup first directional control valve 410' in addition to the first directional control valve 410. The override switch comprises a backup second directional control valve 420' and a backup third directional control valve 430', both in addition to the second directional control valve 420 and the third directional control valve 430. It can be seen that the backup hydraulic circuit, the backup first directional control valve 410', the backup second directional control valve 420' and the backup third directional control valve 430' are configured relative to the backup hydraulic power unit and the engagement mechanism in functionally the same way as the hydraulic circuit, the first directional control valve 410, the second directional control valve 420 and the third directional control valve 430 are configured relatively to the hydraulic power unit and the engagement mechanism.

The first directional control valve 410 and the first backup directional control valve 410' are mechanically coupled to each other, and actuated with the same actuation power (via solenoid 412, in this example) as the first directional control valve 410. The first directional control valve 410 and the first backup directional control valve 410' are mechanically coupled to each other whereby the first directional control valve 410 and the first backup directional control valve 410' are forced to assume mutually the same positions.

The second directional control valve 420 and the third directional control valve 430 and the backup second directional control valve 420' and the backup third directional control valve 430' are all mechanically coupled to each other whereby they are simultaneously movable. They all share the same actuator, such as the spring-return pneumatic actuator 55 described with reference to FIG. 3.

The hydraulic circuit comprises at least two rupture protection valves and the backup hydraulic circuit comprises at least two backup rupture protections valves. Specifically, a first rupture protection valve 425 of the at least two rupture protection valves is located in the pressure-to-close line C, between the first hydraulic communication port 57 and the first directional control valve 410. A second rupture protection valve 435 of the at least two rupture protection valves is configured in a the pressure-to-open line O, between the second hydraulic communication port 58 and the first directional control valve 410. This is copied in the backup hydraulic circuit, whereby a first backup rupture protection valve 425' of the at least two backup rupture protection valves is configured in a backup pressure-to-close line C' and whereby a second backup rupture protection valve 435' of the at least two backup rupture protection valves is configured in a backup pressure-to-open line O'. The pressure-to-close line C and the backup pressure-to-close line C' may be connected to one first hydraulic communication port 57, or, as shown in FIG. 5, a backup first hydraulic communication port 57' may be provided in the coupling part actuator 51 specifically for the backup pressure-to-close line C'. Similarly, the pressure-to-open line O and the backup pressure-to-open line O' may be connected to one second hydraulic communication port 58, or, as shown in FIG. 5, a backup second hydraulic communication port 58' may be provided in the coupling part actuator 51 specifically for the backup pressure-to-open line O'.

Each rupture protection valve and backup rupture protection valve comprises a snap position valve, which has a flow position 441 and a block position 442. These positions are illustrated in the first backup rupture protection valve 425'. When there is a relatively small pressure differential across the snap position valve, it will assume the flow position 441. However, as soon as the pressure differential exceeds a predetermined safety limit, which would be the case if the hydraulic line ruptures such as in the case of rupture 450 in the backup pressure-to-close line C' shown in FIG. 5b, the snap position valves snaps to close. These rupture protection valves and backup rupture protection valves are provided when the hydraulic circuit and the backup hydraulic circuit communicate with each other through the coupling part actuator 51. By snapping to close, these rupture protection valves and backup rupture protection valves isolate the hydraulic circuit or backup hydraulic circuit from any rupture in the other hydraulic circuit. Thus, the engagement mechanism of the emergency disconnection coupler is still under control via the coupling part actuator 51 and the switching system 400 even in case of a rupture.

As a result, the fail-unlocked regime continues to work, even if there is a rupture in the pressure-to-open line O (or backup pressure-to-open line O'). Thus emergency disconnections can continue to be made. Likewise, the fail-locked regime continues to work even if there is a rupture in the pressure-to-close line C (or backup pressure-to-close line C'). Herewith, loss of containment of pressurized gas from the gas connection as a result of unlocking the engagement mechanism is continues to be avoided.

A similar redundancy and rupture protection strategy can be applied on the gate line 56.

FIG. 6 illustrates an example of a hydraulic power unit incorporated in a loading assembly together with a backup hydraulic power unit. The backup hydraulic power unit can share a common hydraulic fluid storage tank 610. One or more pumps 620 are provided in communication with the pressure line P. Also in fluid communication with pressure line P is an accumulator 630. The accumulator 630 is charged with pressurized hydraulic fluid as long as the one or more pumps 620 work. When the pump(s) 620 cease to work, the accumulator is then capable of providing a selected volume of hydraulic fluid at a pressure so that the coupling part actuator 51 of the engagement mechanism can still be actuated to reach or stay in the fail-safe position. The hydraulic return line T is led from the switching system 400 to the hydraulic fluid storage tank 610. The pump may be fed from the hydraulic fluid storage tank, thus closing a hydraulic power loop. The hydraulic power unit may be used to power valves as well, including to power at least the spool-side isolation valve 60 and the blow down valve 80, and optionally also the arm-side isolation valve 70. In this case a plurality of pumps 620 may be needed to ensure enough flow and head can be provided at all times. The backup hydraulic power unit employs a backup pump 620' that is separate from the one or more pumps 620. Preferably, the backup pressure line P' is used exclusivity to power the coupling part actuator 51. The backup hydraulic return line T' may be joined with the hydraulic return line T of the (main) hydraulic power unit. Preferably, a backup accumulator 630' is configured in communication with the backup pressure line P'.

As generally indicated in FIG. 1, a breakaway weak link 46 may be provided in the gas connection between the spool-side isolation valve 60 and the arm-side isolation valve 70. The breakaway weak link should be the mechanically weakest link in the contained gas flow path of the entire loading arm assembly counting from the gas send out header 10 on one side of the arm to the gas distribution arrangement 210 on the other side of the arm. The breakaway link serves to ensure the contained gas flow path breaks open at a preconceived location in case the mechanical load on the loading arm arrangement exceeds a predetermined limit, a situation which may occur when for some reason the floating gas processing unit 100 breaks away from the other structure 200.

The breakaway weak link 46 can be provided anywhere in the gas connection between the spool-side isolation valve 60 and the arm-side isolation valve 70, to ensure the contained gas flow path breaks open between these isolation valves thereby providing the maximum possible degree of isolation available in the arrangement by closing the available isolation valves once the contained gas flow path breaks open at the location dictated by the breakaway weak link 46.

Preferably, the preconceived location of breaking open dictated by the breakaway weak link such that the gas connection breaks open between the actuated coupling part 20 of the emergency disconnection coupler and the arm-side isolation valve 70. Herewith it is achieved that the actuated coupling part 20 does not have to be suspended on the loading arm 500 in the event of a breakaway event.

The breakaway weak link may comprise a rupture zone in one of the pipe pieces comprised in the gas connection. Such a rupture zone may take the form of a zone with a relatively thin pipe wall compared to the pipe wall thickness in the piping outside the zone. Alternatively, the rupture zone may take the form of a stress razor, which introduces a preconceived fatigue point in the piping comprised in the gas connection.

An example embodiment is illustrated in FIG. 7, which shows an embodiment of the gas connection between the spool-side isolation valve 60 and the arm-side isolation valve 70 that can be employed on a floating gas processing unit. The proximal end 570 of the loading arm including part of the gas conduit 580, and part of the spool part conduit 30 are also shown to provide reference. The breakaway weak link 46 is provided in the pipe piece comprised in the passive coupling part 40. In the embodiment shown in FIG. 7, but this is not a requirement of the invention, the passive coupling part 40 of the emergency disconnection coupler forms part of an interface pipe piece 45 which may be connected to the gas conduit 580 of the loading arm via a flange connection 43. The rupture zone 48 is arranged on the interface pipe piece 45, as can be seen in the enlarged cross section of the breakaway weak link 46 shown in FIG. 7. The rupture zone 48 has been schematically represented as a zone having a smaller thickness in a first pipe wall 47 of the passive coupling part 40.

The interface pipe piece 45 is easily replaceable by decoupling the flange connection 43, for instance for inspection. A choice can be made in the procedure of operation about whether the flange connection 43 or the emergency disconnection coupler is used for engaging and disengaging the loading arm during normal operations. In the first option, the flange connection 43 is used to engage and disengage the loading arm to the floating gas processing unit 100 for normal operations while the emergency disconnection coupler is only used for disengaging the loading arm from the floating gas processing unit. In the second option, the flange connection 43 is pre-assembled on the loading arm prior to engaging, whereby the emergency disconnection coupler is used not only for disengaging the loading arm from the floating gas processing unit 100 in emergency situations but also for the engagement and disengagement operations in the course of normal, non-emergency, operations.

It is noted that an interface pipe piece as proposed above may also be employed without a rupture zone if this is considered beneficial to the operation of the loading arm and/or the emergency disconnection coupler.

FIG. 8 illustrates another embodiment of a breakaway weak link that may be employed on any emergency disconnect coupler. The figure schematically shows, in cross section, a small part of the passive coupling part 40 and a small part of the actuated coupling part 20 including the mechanical jaw 25 that forms part of the actuated coupling part 20. A plurality of such jaws are comprised in the emergency disconnection coupler, distributed along the circumference of the gas connection. The jaw serves to releasably clamp the actuated coupling part 20 against the passive coupling part 40 when in the locked position. The jaw may press a first coupling flange 49 of the passive coupling part 40 against the face of a second coupling flange 29 of the actuated coupling part 20, in a gas-tight manner, when the actuated coupling part 20 is in the lock position. The jaw 25 is moved away from the first and second flanges when the actuated coupling part 20 is moved to the unlocked position. The first coupling flange 49 may be provided on an open end of a first pipe wall 47 of the passive coupling part 40 and the second coupling flange 29 may be provided on an open end of a second pipe wall 27, belonging to the actuated coupling part 20.

The breakaway weak link may be integrated in the coupling mechanism, particularly in the jaws 25. As example there is shown an embodiment comprising a break zone 22 provided in the mechanical jaw. The break zone 22 suitably is provided in the form of a stress razor.

An advantage of combining the breakaway weak link with the coupling mechanism is that the absolute force and the dynamic straining in the coupling mechanism are both generally smaller than in the pipe piece between the coupler and the loading arm, as the jaws do not have to contain the internal gas pressure. Moreover, by providing the breakaway weak link in the actuated coupling part, it can never be inadvertently forgotten to install for instance by placing an incorrect interface pipe piece.

The elements in FIG. 8 are represented very schematically to illustrate that the breakaway weak link may be integrated with the actuated coupling part of an emergency disconnection coupler. The details of design are not limiting the invention. A variety of detailed designs of jaw-based actuated coupling parts are known in the art. Reference is made to U.S. Pat. No. 6,843,511 as one example.

Regardless of the type of embodiment in which the breakaway weak link is employed, it is recommended that the entire loading arm arrangement is mechanically compliant with the breakaway weak link design forces to ensure the contained gas flow path breaks open at the preconceived location and not at an unintended other location.

In the embodiments so far described, the spool-side isolation valve 60 and the arm-side isolation valve 70 each are associated with their own spool-side isolation valve actuator 61 and arm-side isolation valve actuator 71. FIG. 9 shows an alternative embodiment that can be employed instead, whereby the spool-side isolation valve actuator 61 is employed for switching both the spool-side isolation valve 60 and the arm-side isolation valve 70. To this end, the spool-side isolation valve 60, which is mounted on the floating gas processing unit 100, comprises a mechanical link bar 65. The mechanical link bar 65 is functionally coupled, via a coupling mechanism 66, to the spool-side isolation valve 60 whereby any actuated movement of the spool-side isolation valve is transmitted to a related movement of the mechanical link bar 65. The related movement may be any suitable movement such as a rotary movement or a translation movement, selected according to suitable design principles. The mechanical link bar 65 is releasably connectable to a receiving arm coupling mechanism 76, which is functionally coupled to the arm-side isolation valve 70 whereby the related movement of the mechanical link bar 65 drives the arm-side isolation valve 70 to the same valve position as the spool-side isolation valve 60. This way, a single valve actuator can actuate two isolation valves.

An advantage of embodiments wherein a single valve actuator can actuate the two isolation valves is that the arm-side isolation valve actuator 71 can be omitted. As a result, the weight to be supported by the loading arm 500 can be lower. Moreover, the operational interaction between the emergency disconnect power assembly 50 and the arm-side isolation valve 70 takes place via the mechanical link bar 65, so that no quick connection port (such as quick connection port 73) is needed in any of the hydraulic lines of the entire loading arm arrangement. Herewith, inadvertent spillage of hydraulic fluid into the environment, such as into the water 4, can be avoided.

Control of at least the emergency disconnection coupler and the spool-side and arm-side isolation valves and the blow down valves is preferably done from the floating gas processing unit. All input/output signals related to emergency disconnections are communicated directly from the floating gas processing plant without passing through the standard loading arm control package.

The internal gas pressure of the gas in the gas connection is generally envisaged to be within a range of from 40 barg to 130 barg under normal operating conditions wherein the processed gas is transferred between the floating gas processing unit and the other structure (e.g. the shore side).

While it is advantageous to configure the emergency disconnection coupler such that the actuated coupling part stays connected to the spool part conduit regardless of whether the actuated coupling part is in its locked or unlocked position or when the breakaway weak link has ruptured, the principles of the breakaway weak link described herein can also be applied in embodiments wherein the emergency disconnection coupler is configured such that the actuated coupling part stays connected to the loading arm when the actuated coupling part is in its unlocked position and/or when the breakaway weak link has ruptured.

The person skilled in the art will understand that invention and the specific embodiments disclosed herein may be applied in a wide variety of situations, particularly off-shore on ship-shaped structures. Examples include floating oil and/or gas processing facilities, including floating production, storage and offloading (FPSO) structures, floating liquefied natural gas plants (FLNG) plants (which may or may connect directly to sub-sea wells or which may be fed from other facilities), floating storage and regas units (FSRU) which comprise LNG storage and regasification equipment.

The person skilled in the art will understand that the present invention can be carried out in many various ways without departing from the scope of the appended claims.

The invention claimed is:

1. A loading assembly for conveying a pressurized gas stream between a floating structure and another structure that is located adjacent to the floating structure, the loading assembly comprising:
   a gas conduit adapted to extend between the floating structure and the other structure, to convey a pressurized gas stream between the two structures;
   an emergency disconnection coupler configured in the gas conduit for establishing a selectively connectable and disconnectable gas connection between the floating structure and the other structure through the gas conduit, and wherein the emergency disconnection coupler comprises an actuating coupling that is selectively switchable between a locked position and an unlocked position, whereby in said locked position the gas connection is established and whereby in said unlocked position the gas connection is interrupted whereby the actuating coupling physically disengages when the actuating coupling is in the unlocked position;
   a switching system configured to control the switching of the actuating coupling in the emergency disconnection coupler between the locked position and the unlocked position, wherein the switching system is adapted to be responsive to two distinct fail-safe regimes contingent upon an internal gas pressure in the gas connection:
   a fail-unlocked regime when the internal gas pressure in the gas connection is below a preselected override threshold value, which sets the switching system to unlock the actuating coupling upon power loss, and
   a fail-locked regime which sets the switching system to lock the actuating coupling when the internal gas pressure in the gas connection is at or above the preselected override threshold value,
   the switching system comprising:
      a selection switch functionally coupled to the actuating coupling to control switching of the actuating coupling between said locked position and unlocked position at least when the switching system is in said fail-unlocked regime; and
      an override switch having an override position that is activated by the internal gas pressure, and a release position, wherein the override switch is forced in the override position when the internal gas pressure is at or above the preselected override threshold value, in which case the pressure gate overrides the selection switch whereby, regardless of whether the selection switch is in open state or in closed state, the actuating coupling is instructed to assume the locked position, and wherein movement of the actuating coupling from said locked position to said unlocked position can only proceed when said internal gas pressure is below said preselected override threshold value and the override switch is not activated, wherein the override switch is part of a pressure gate that is driven by the internal gas pressure within the gas connection.

2. The loading assembly of claim 1, wherein the selection switch has an open state and a closed state whereby upon selecting the open state the actuating coupling is instructed to assume the unlocked position and whereby upon selecting the closed state the actuating coupling is instructed to assume the locked position, wherein the selection switch is a fail-open switch.

3. The loading assembly of claim 1, wherein the override switch is in fluid communication with the gas connection via a gate line, whereby the override switch is physically forced into the override position by the internal gas pressure in the gas connection, and into the release position by a bias force directed against said internal gas pressure.

4. The loading assembly of claim 1, wherein the actuating coupling comprises a hydraulically powered actuator powered by a hydraulic fluid that is circulated through a hydraulic circuit by a hydraulic power unit from a pressure source to a tank,
wherein the hydraulically powered actuator comprises a first hydraulic communication port through which the hydraulic fluid can pass and a second hydraulic communication port through which the hydraulic fluid can pass,
wherein a positive pressure differential between the first hydraulic communication port and the second hydraulic communication port causes a driving force on the actuating coupling directed from the unlocked position towards the locked position, and wherein a negative pressure differential between the first hydraulic communication port and the second hydraulic communication port causes an opposite driving force on the actuating coupling directed from the locked position to the unlocked position.

5. The loading assembly of claim 4, wherein the pressure source comprises a pump and an accumulator, wherein the accumulator is sized to hold a sufficient amount of hydraulic fluid under sufficient pressure to force the actuating coupling from the unlocked into the locked position when the hydraulic fluid is released from the accumulator.

6. The loading assembly of claim 4, wherein the selection switch comprises a first directional control valve configured in the hydraulic circuit between the first hydraulic communication port and the second hydraulic communication port on one side and the hydraulic power unit on another side, wherein the first directional control valve comprises at least two positions, whereby one of the at least two positions corresponds to the open state and another one of the at least two positions corresponds to the closed state, wherein the first directional control valve is moved into its closed state upon applying actuation power, wherein the first directional control valve is biased to move towards the open state upon loss of actuation power.

7. The loading assembly of claim 6, wherein the override switch comprises a second directional control valve and a third directional control valve, which second directional control valve and third directional control valve are simultaneously movable, wherein the override switch is biased in a direction against the internal gas pressure.

8. The loading assembly of claim 7, wherein the override switch comprises a pneumatic actuator that transfers the internal gas pressure into movement of the override switch in an override position when the internal gas pressure is at or above the preselected override threshold value, and wherein the bias imposes movement of the override switch out of the override position.

9. The loading assembly of claim 6, wherein the loading assembly comprises a backup hydraulic circuit, a backup hydraulic power unit in addition to the hydraulic circuit and the hydraulic power unit, and
wherein the selection switch comprises a backup first directional control valve, and
wherein the override switch comprises a backup second directional control valve and a backup third directional control valve, all in addition to the first directional control valve, the second directional control valve and the third directional control valve, and
wherein the backup hydraulic circuit, the backup first directional control valve, the backup second directional control valve and the backup third directional control valve are configured relative to the backup hydraulic power unit and the actuating coupling, in functionally the same way as the hydraulic circuit, the first directional control valve, the second directional control valve and the third directional control valve are configured relatively to the hydraulic power unit and the actuating coupling, and
wherein the first directional control valve and the first backup directional control valve are mechanically coupled and actuated with the same actuation power as the first directional control valve,
whereby the first directional control valve and the first backup directional control valve are forced to assume mutually the same positions, and
wherein the second directional control valve and the third directional control valve and the backup second directional control valve and the backup third directional control valve are all mechanically coupled to each other whereby they are simultaneously movable, and
wherein the hydraulic circuit comprises at least two rupture protection valves and the backup hydraulic circuit comprises at least two backup rupture protections valves, each rupture protection valve and backup rupture protection valve comprising a snap position valve, configured to snap to close when a pressure differential across the snap position valve exceeds a predetermined safety limit,
wherein in the hydraulic circuit a first of the at least two rupture protection valves is located between the first hydraulic communication port and the first directional control valve, and a second of the at least two rupture protection valves is located between the second hydraulic communication port and the first directional control valve, and
wherein a first of the at least two backup rupture protection valves and a second of the at least two backup rupture protection valves are located in functionally corresponding positions in the backup hydraulic circuit as their first and second rupture valves counterparts.

10. The loading assembly of claim 1, further comprising a spool-side isolation valve and an arm-side isolation valve, both configured in the gas conduit whereby the gas connection is between the spool-side isolation valve and the arm-side isolation valve.

11. The loading assembly of claim 10, wherein each of the spool-side isolation valve and the arm-side isolation valve and the blow down valve are biased valves whereby the blow down valve is moved in open position when the blow down valve is unpowered, and the spool-side isolation valve is moved in closed position when the spool-side isolation valve is unpowered and the arm-side isolation valve is moved in closed position when the arm-side isolation valve is unpowered.

12. The loading assembly of claim 10, further comprising a breakaway weak link located within the gas connection between the spool-side isolation valve and the arm-side isolation valve to ensure the gas connection breaks open at a preconceived location between the spool-side isolation valve and the arm-side isolation valve, in case the mechanical load on the loading arm arrangement, caused by relative movement between the floating structure and the other structure, exceeds a predetermined limit.

13. The loading assembly of claim 10, further comprising a blow down valve that fluidly communicates with the gas connection via a blow down junction arranged in the gas connection between the spool-side isolation valve and the emergency disconnection coupler.

* * * * *